United States Patent
McDowell et al.

(10) Patent No.: US 10,575,584 B2
(45) Date of Patent: *Mar. 3, 2020

(54) CUSTOMIZED SHOE TEXTURES AND SHOE PORTIONS

(71) Applicant: Converse Inc., Boston, MA (US)

(72) Inventors: Sean M. McDowell, Portland, OR (US); Bryan Paul Cioffi, Gloucester, MA (US); Stephen N Bruno, Wellesley, MA (US)

(73) Assignee: Converse Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,008

(22) Filed: Feb. 2, 2018

(65) Prior Publication Data

US 2018/0263329 A1 Sep. 20, 2018

Related U.S. Application Data

(63) Continuation of application No. 14/806,820, filed on Jul. 23, 2015, now Pat. No. 9,883,711, which is a
(Continued)

(51) Int. Cl.
*G06F 19/00* (2018.01)
*A43B 3/00* (2006.01)
(Continued)

(52) U.S. Cl.
CPC .......... *A43B 3/0036* (2013.01); *A43B 3/0078* (2013.01); *B29C 64/153* (2017.08);
(Continued)

(58) Field of Classification Search
CPC ... A43B 3/0036; A43B 3/0078; B29C 64/153; B33Y 80/00; G06F 17/00; G06T 17/00
See application file for complete search history.

(56) References Cited

U.S. PATENT DOCUMENTS

2001/0020222 A1  9/2001 Lee et al.
2004/0133431 A1*  7/2004 Udiljak .................. A43B 7/141
                                                            705/26.1
(Continued)

FOREIGN PATENT DOCUMENTS

CN      202476607 U    10/2012
WO   2009000371 A1    12/2008
WO   2009055451 A1     4/2009

OTHER PUBLICATIONS

Sangkun Park et al "A System for Rapid Design and Manufacturing of Custom-Tailored Shoes", KSME International Journal. vol. 14, No. 6, pp. 675-689, 2000, XP002757590, Retrieved from the Internet: URL: http://citenpl.internal.epo.org/wf/web/citenpl/citenpl.html?.sub.—ur- I=http%3A//www.springerlink.com/index/967242H7434U6238.pdf [retrieved on May 10, 2016] * p. 675, right col.; p. 686, left col., pgph.l; fig. *.
(Continued)

*Primary Examiner* — Kidest Bahta
(74) *Attorney, Agent, or Firm* — Shook, Hardy and Bacon LLP

(57) ABSTRACT

A shoe with a three-dimensional (3-D) surface texture created using rapid manufacturing techniques is provided. A plurality of 3-D surface texture options is presented on a user interface; each of the options is associated with one of a plurality of 3-D surface textures to be applied to a portion of a shoe. A selection of a 3-D surface texture is received and is used in part to generate a design file. The design file is used to instruct a rapid manufacturing device to manufacture the portion of the shoe comprised of the 3-D surface texture using a rapid manufacturing technique.

19 Claims, 9 Drawing Sheets

Related U.S. Application Data continuation of application No. 13/656,998, filed on Oct. 22, 2012, now Pat. No. 9,122,819.

(51) Int. Cl.
*G06T 17/00* (2006.01)
*B33Y 80/00* (2015.01)
*B29C 64/153* (2017.01)
*G06F 17/00* (2019.01)

(52) U.S. Cl.
CPC .............. *B33Y 80/00* (2014.12); *G06F 17/00* (2013.01); *G06T 17/00* (2013.01)

(56) References Cited

U.S. PATENT DOCUMENTS

| | | | | |
|---|---|---|---|---|
| 2009/0073162 | A1* | 3/2009 | Waatti | A43D 3/02 345/419 |
| 2009/0093891 | A1* | 4/2009 | Summit | A61F 2/5046 623/27 |
| 2009/0126225 | A1* | 5/2009 | Jarvis | A43B 13/41 36/29 |
| 2010/0036753 | A1* | 2/2010 | Harvill | G06Q 30/06 705/26.1 |
| 2010/0262054 | A1 | 10/2010 | Summit et al. | |
| 2012/0117738 | A1 | 5/2012 | Jarvis | |
| 2012/0281013 | A1 | 11/2012 | Mandavi et al. | |
| 2013/0031803 | A1* | 2/2013 | Koch | A43B 1/0072 36/100 |
| 2014/0137965 | A1 | 5/2014 | Truitt et al. | |
| 2014/0279180 | A1* | 9/2014 | Beaver | G06Q 30/0601 705/26.5 |

OTHER PUBLICATIONS

Ross Barber, London College of Fashion, Showtime: "MA Fashion Footwear"; http://showtime.arts.ac.uk/rossbarber; 1 page.
Ross Barber: "A Wrong Mongrel"; http://www.ross-barbercom; 1 page.
Within Lab: "With Our Unique Optimised Lattice Structure We Custom Build to Your Exact Specifications"; http://within-lab.com; 1 page.
Within Lab: "Trinity's Sole Where Form Follows Function"; http://within-lab.com/case-studies/index14.php; 2 pages.
Communication pursuant to Article 94(3) dated Sep. 10, 2018 in European Patent Application No. 13849341.6, 10 pages.

* cited by examiner

CUSTOMIZED SHOE TEXTURES AND SHOE PORTIONS

CROSS-REFERENCE TO RELATED APPLICATIONS

This application having U.S. application Ser. No. 15/887,008, filed Feb. 2, 2018, and entitled "Customized Shoe Textures and Shoe Portions," is a Continuation Application of U.S. application Ser. No. 14/806,820, entitled "Customized Shoe Textures and Shoe Portions," and filed Jul. 23, 2015, which issued as U.S. Pat. No. 9,883,711 on Feb. 6, 2018. The '820 application is a Continuation Application of U.S. application Ser. No. 13/656,998, entitled "Customized Shoe Textures and Shoe Portions," and filed Oct. 22, 2012, which issued as U.S. Pat. No. 9,122,819 on Sep. 1, 2015. The entireties of the aforementioned applications are incorporated by reference herein.

BACKGROUND

The manufacturing of shoes is typically a labor intensive and inefficient process that often leaves the consumer with little chance of customizing the shoe according the consumer's personal taste or functional needs. Additionally, shoes have generally been manufactured using conventional materials that may not be optimal for the individual requirements of the consumer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

At a high level, the present invention is directed toward a shoe with customized three-dimensional (3-D) textures and customized 3-D functional shoe portions created using rapid manufacturing techniques. A user is able to select from a variety of 3-D surface texture options corresponding to 3-D surface textures, and the user is able to select from a variety of 3-D functional portion options corresponding to 3-D functional shoe portions. The selected 3-D surface texture(s) and/or functional portion(s) may be applied to different areas of the shoe using a rapid manufacturing device. The result is a shoe with a customized appearance and structure—an appearance and structure that meet the functional and aesthetic needs of the user.

Accordingly, in one aspect the present invention is directed to a computerized method carried out by a computer running on a processor for creating a 3-D surface texture on at least a first portion of a shoe using rapid manufacturing techniques. The method comprises presenting a plurality of 3-D surface texture options on a user interface; each of the plurality of 3-D surface texture options is associated with one of a plurality of 3-D surface textures configured to be applied to the at least the first portion of the shoe. A selection of a first 3-D surface texture option is received; the first 3-D surface texture option is associated with a first 3-D surface texture. An augmented design file is generated based at least on a 3-D shoe design data file and the first 3-D surface texture file. The augmented data file is used to instruct a rapid manufacturing device to manufacture the first portion of the shoe comprised of the first 3-D surface texture using a rapid manufacturing technique.

In another aspect, the present invention is directed to a computerized method carried out by a computer running on a processor for creating a three-dimensional (3-D) portion of a shoe having a first type of functional property using rapid manufacturing techniques. The method comprises presenting a plurality of 3-D functional portion options on a user interface; each of the plurality of 3-D functional portion options is associated with one of a plurality of 3-D functional portions to be applied to at least an area of a shoe configuration. A selection of at least one 3-D functional portion is received. The at least one 3-D functional portion option is associated with a first 3-D functional portion. A data file is created based at least on the shoe configuration and the first 3-D functional portion. Using the data file, a rapid manufacturing device is instructed to manufacture at least the first 3-D functional portion of the shoe configuration.

In yet another aspect, the present invention is directed to a computerized method carried out by a computer running on a processor for manufacturing a shoe upper with a customized 3-D exterior surface texture. The method comprises presenting a plurality of 3-D surface texture options on a user interface; each of the plurality of 3-D surface texture options is associated with one of a plurality of 3-D surface textures to be applied to at least a portion of a first shoe upper configuration. A selection of at least one 3-D surface texture option is received; the at least one 3-D surface texture option is associated with a first 3-D surface texture. A data file is created based at least on the first shoe upper configuration and the selected at least one 3-D surface texture. The data file is used to instruct a laser sintering device to manufacture the at least the portion of the first shoe upper configuration comprised of the first 3-D surface texture.

BRIEF DESCRIPTION OF THE DRAWINGS

Examples are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

The present invention is directed toward a shoe with customized three-dimensional (3-D) textures and customized 3-D functional shoe portions created using rapid manufacturing techniques. A user is able to select from a variety of 3-D surface texture options corresponding to 3-D surface textures, and the user is able to select from a variety of 3-D functional portion options corresponding to 3-D functional shoe portions. The selected 3-D surface texture(s) and/or functional portion(s) may be applied to different areas of the shoe using a rapid manufacturing device. The result is a shoe with a customized appearance and structure—an appearance and structure that meet the functional and aesthetic needs of the user.

Figure 1:
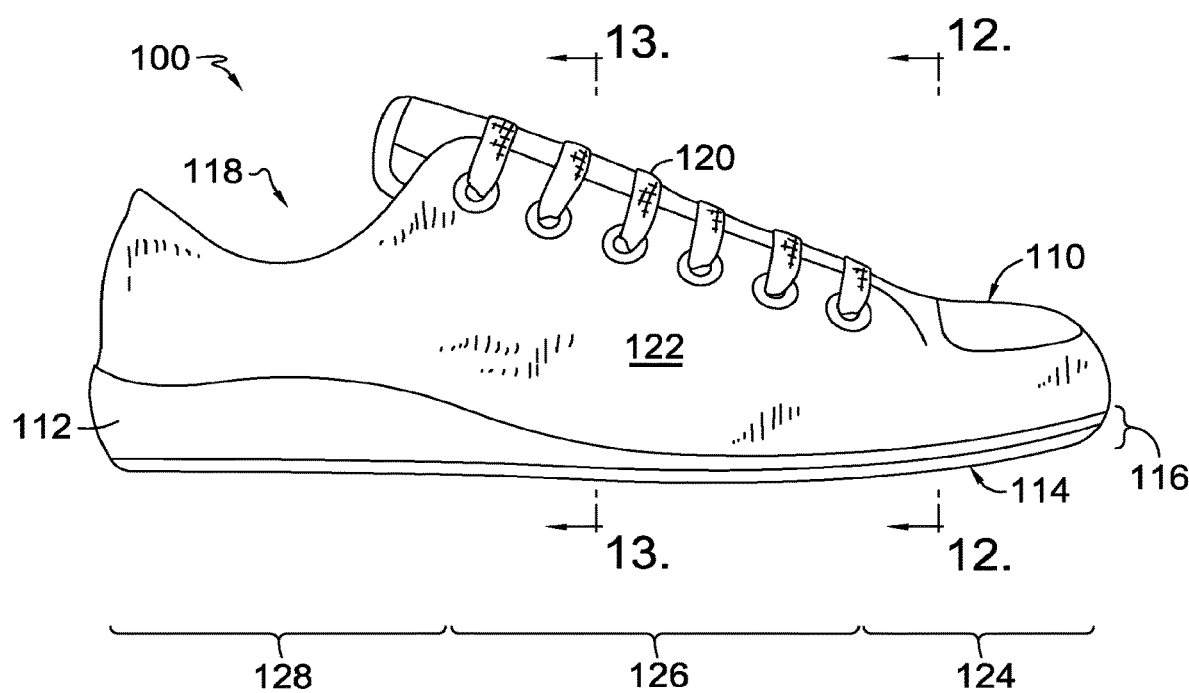
FIG. 1 depicts a side view of an exemplary shoe for reference purposes in accordance with aspects of the present invention.

FIG. 1 depicts an exemplary shoe 100. The shoe 100 includes an upper 110 and a sole structure 116. The sole structure, in turn, includes a midsole 112 and an outsole 114. For reference purposes, the shoe 100 may be divided into three general regions or areas: a forefoot or toe region 124, a midfoot region 126, and a heel region 128. The shoe 100 also includes a lateral side 122 and a medial side (not shown). The lateral side 122 extends along a lateral side of a user's foot and generally includes the regions 124, 126, and 128. The medial side extends along a medial side of the user's foot and also includes the regions 124, 126, and 128. The lateral side 122, the medial side, and the regions 124, 126, and 128 are not intended to demarcate specific areas of the shoe 100. Instead, they are intended to represent general areas of the shoe 100 and are used for reference purposes for the following discussion. For example, the medial side and the lateral side 122 may converge near the toe region 124 at respective sides of a toe box. Similarly, it is contemplated that the medial side and the lateral side 122 may also converge at respective sides of an Achilles reinforcement proximate the heel region 128. Therefore, depending on the shoe design and construction, the terms medial, lateral, toe, heel, and the like generally refer to a proximate location and may not be limiting.

FIG. 1 also depicts a line 12-12 bisecting the shoe 100 proximate the forefoot region 124. The line 12-12 represents a cutline used in the depiction of FIG. 12, which is discussed hereinafter. FIG. 1 additionally depicts a line 13-13 that bisects the shoe 100 proximate the midfoot region 126. The line 13-13 represents a cutline used in the depiction of FIG. 13, which is also discussed hereinafter.

The upper 110 is generally secured to the sole structure 116 and defines a cavity for receiving a foot. Access to the cavity is provided by an ankle opening 118 located in the heel region 128. A lace 120 extends through various apertures in the upper 110. The lace 120 may act to selectively increase or decrease the size of the ankle opening 118 and the girth of the upper 110 as the lace 120 applies a pressure across a forefoot opening extending between the medial side and the lateral side 122.

Various materials may be used to construct the upper 110. For example, the upper 110 may be constructed of a uniform sintered material manufactured using a rapid manufacturing technique. A uniform sintered material is not limited to a homogeneous material, but instead contemplates a composite-like material comprised of a number of discrete materials that when sintered, form a common material. Therefore, the term uniform represents a resulting common material that is not intermixed with other non-commonly formed materials. This process will be explained in greater depth below. The upper 110 may also be constructed of a sintered material in combination with conventional materials including leather, synthetic leather, rubber, textiles, mesh, polymer foams, and/or other traditional shoe-constructing materials. The conventional materials and the sintered materials(s) may be stitched, adhesively bonded, or otherwise fused to each other.

The sole structure 116 may be integrally formed with the upper 110 or constructed separately and secured to the upper 110. As mentioned above, the sole structure 116 comprises the outsole 114 and the midsole 112; however it is also contemplated that the sole structure 116 may be a cup sole, a sandal-like structure, or any combination of outsole, midsole, and insole. The outsole 114 forms a ground-engaging surface of the sole structure 116. The outsole 114 and/or the midsole 112 may be formed of conventional materials such as rubber, leather, or a polymer foam material (polyurethane or ethylvinylacetate for example). Alternatively, the outsole 114 and/or the midsole 112 may be formed, in part or in whole, of a uniform sintered material manufactured using a rapid manufacturing technique. The outsole 114 may be integrally formed with the midsole 112, or the outsole 114 may be attached to a lower surface of the midsole 112. Further, it is contemplated that the midsole 112 may be inserted into a cavity within the outsole 114.

As a preface to the more detailed discussion below, a brief overview of rapid manufacturing fabrication techniques will be provided. Rapid manufacturing techniques may include laser sintering, stereolithography, solid deposition modeling, and the like. Rapid manufacturing techniques involve creating a 3-D design in a data file, such as a Computer Aided Design (CAD) file, and building the object of the 3-D design in an automated layer-by-layer process. The rapid manufacturing equipment or device reads the 3-D design from the data file and lays down successive layers of powder, liquid, or sheet material to build the 3-D object. Selected layers are joined together by the rapid manufacturing device, such as a sintering laser, to form the 3-D object of the design.

One example of a rapid manufacturing technique is laser sintering. Laser sintering involves creating a 3-D design in a data file, such as a CAD file. The laser sintering equipment reads/processes the CAD file and forms the 3-D object of the design, such as, for example, an upper or portion of an upper for a shoe, using a high-powered laser to selectively fuse powders or small particles of plastic, metal, polymer, ceramic, or glass powders. The laser selectively fuses materials by scanning cross-sections generated from the data file or scan data on the surface of a material bed. After each cross-section is scanned and selected areas fused, the material bed is lowered by one layer thickness, and a new layer of material is applied on top. The process is repeated until the 3-D object is complete. Material that is not fused is subsequently removed.

Figure 2:
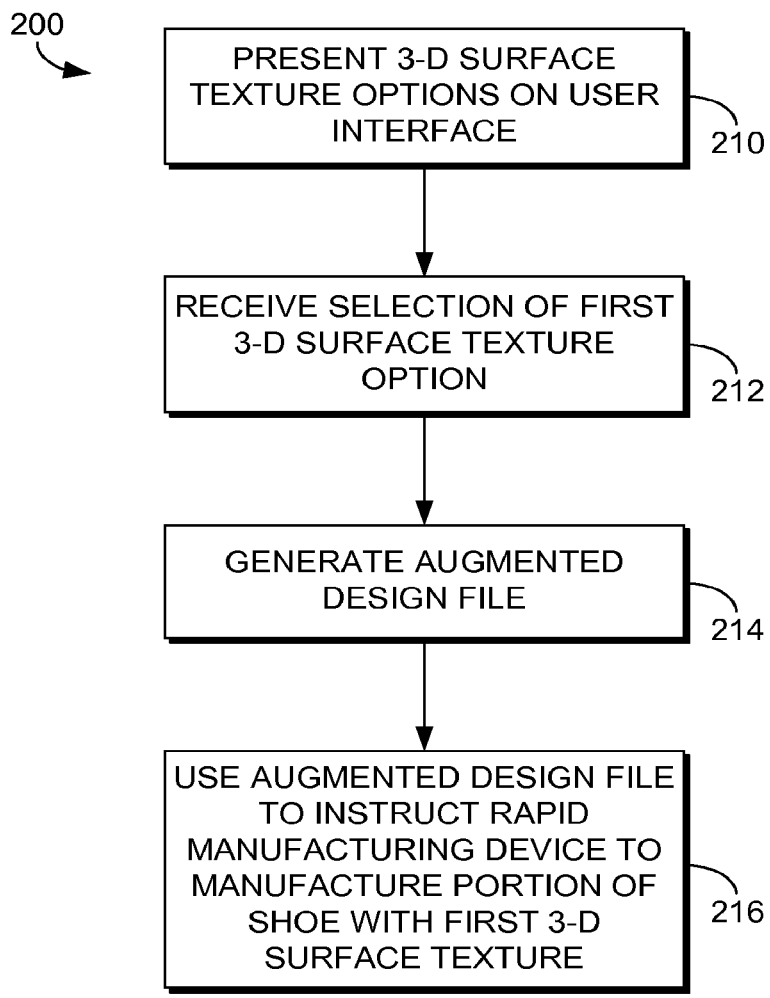
FIG. 2 depicts a flow diagram of an exemplary method of creating a three-dimensional surface texture on a shoe using rapid manufacturing techniques in accordance with aspects of the present invention.

Turning now to FIG. 2, a flow diagram is depicted illustrating an exemplary method 200 for creating a 3-D surface texture on a portion of a shoe (such as the shoe 100 of FIG. 1) using rapid manufacturing techniques. The portion of the shoe may comprise a complete upper (such as the upper 110 of FIG. 1), a complete midsole (such as the midsole 112 of FIG. 1), or a complete outsole (such as the outsole 114 of FIG. 1). As well, the portion of the shoe may comprise a portion of the upper, a portion of the midsole, or a portion of the outsole. In addition, the portion of the shoe may comprise any combination of the upper, midsole, and outsole.

At a step 210, 3-D surface texture options are presented on a user interface, such as a display monitor coupled with a computing device. The 3-D surface texture options are associated with a variety of 3-D surface textures that are configured to be applied to a portion of the shoe. The options may include product or identification codes corresponding to different 3-D surface textures, textual descriptions of the different 3-D surface textures, visual images of the different textures, auditory descriptions of the different textures, and the like. In one aspect, the 3-D surface texture options presented may depend on the portion of the shoe to which the 3-D surface texture will be applied. For example, some surface textures may be suitable for a toe cap of a shoe, while other surface textures may be suitable for the bottom of an outsole.

The different types of 3-D surface textures are myriad. The textures may include geometric shapes, leather-like textures, suede-like textures, grid-like textures, scale-like textures, plate-like textures, textual or numerical elements, character elements, design elements, and the like. Additionally, users may customize their own 3-D surface texture. For instance, one of the 3-D surface texture options may enable a user to access a digital modeling tool to create a customized 3-D surface texture.

In one aspect, the 3-D surface texture options are presented after (or prior to) a scan of a foot of a user is performed. The scan may be performed using known methods, computer systems, and software. The scan is performed to obtain various physical characteristics of the foot of the wearer in order to design a customized shoe that fits the specifications and characteristics of the user's foot. From the scan, a 3-D shoe design data file is created that integrates features specific to a scanned foot (e.g., arch support, width, and/or length) and may be stored in association with a data store.

At a step 212, a selection of a first 3-D surface texture option is received. The first 3-D surface texture option is associated with a first 3-D surface texture to be applied to a portion of the shoe. In one aspect, selections of additional 3-D surface texture options corresponding to other 3-D surface textures may also be received. The other 3-D surface textures are configured to be applied to portions of the shoe as well. The first 3-D surface texture may be the same or different from the other 3-D surface textures. As well, the portion of the shoe to which the other 3-D surface textures will be applied may be the same or different as the portion of the shoe to which the first 3-D surface texture will be applied. By way of example, a user may select a grid-like surface texture to be applied to the toe region of the upper and a suede-like surface texture to be applied to the remaining portion of the upper of the shoe. In another example, a user may select a reptilian-like texture to be applied to an upper of a shoe and additionally select a design element (such as a snake) to be applied to a portion of the upper so that the snake appears to be resting on the reptilian-like texture. Therefore, it is contemplated that a user makes a selection of the 3-D surface texture option, which is then received by a system for applying an associated surface texture to a design file of the affected shoe portion.

At a step 214, an augmented design file is generated based at least on the 3-D shoe design data file created subsequent to scanning the user's foot and the received selections of the 3-D surface textures. Further, it is contemplated that the scanning of a foot is optional and may not be implemented in exemplary aspects. The 3-D shoe design data file may already be stored in association with a data store. Once the 3-D surface texture option is received, the 3-D shoe design data file is updated to reflect the 3-D surface texture to be applied to the portion of the shoe. The 3-D shoe design data file may be augmented multiple times as different 3-D surface texture options are received. It is contemplated that the augmenting of the design data file includes applying appropriate information and/or calls to information such that when a rapid manufacturing process implements the design data file, the resulting object includes the selected texture(s) in a desired portion.

In one aspect, the 3-D shoe design data file is a generic file intended to mass produce shoes of a certain size using rapid manufacturing techniques. In other words, in some aspects, the 3-D shoe design data file may not be specific to the characteristics of an individual user. The generic 3-D shoe design data file may still be augmented or modified upon receiving selections of one or more 3-D surface texture options (e.g., a factory employee may select one or more surface textures to be applied to the shoe).

At a step 216, the augmented design file is used to instruct a rapid manufacturing device to manufacture at least the portion(s) of the shoe comprised of one or more 3-D surface textures using a rapid manufacturing technique. As mentioned above, rapid manufacturing techniques may include laser sintering, stereolithography, solid deposition modeling, and the like.

Using the augmented design file, for example, a layer of powder may be dispersed to form an initial layer of the portion being created. Additional layers of powder may be dispersed on top of the initial layer and a high-powered laser may be used to selectively fuse the layers of powdered material together to begin forming the portion of the shoe. Additional layers of powder are then added and selectively fused until the 3-D surface texture is created. The powder that is not fused is eventually removed. A powder-like material is used here for explanation purposes, but, as previously discussed, any type of material is contemplated.

In one aspect, the 3-D surface texture is created using colored powders. By way of illustrative example, an area of the upper (or midsole or outsole) without a 3-D surface texture may be a first color, and the portion of the upper comprising the 3-D surface texture may be a second color. Further, the user may be able to specify the color of the 3-D surface texture. Additionally different types of powders or materials may be used to impart different functional properties to the 3-D surface textures. For example, some powders when fused may form a more rigid material as compared to other powders. Rigid-type powders may be used to create a 3-D surface texture in the heel region of an upper—an area that typically needs more support.

The portion formed using the rapid manufacturing technique may be formed using any known material suitable for use in rapid manufacturing processes and sufficiently flexible to form a somewhat flexible, bendable article. In some examples, the portion may be formed using a thermoplastic elastomer, or other similar materials.

Figure 3:
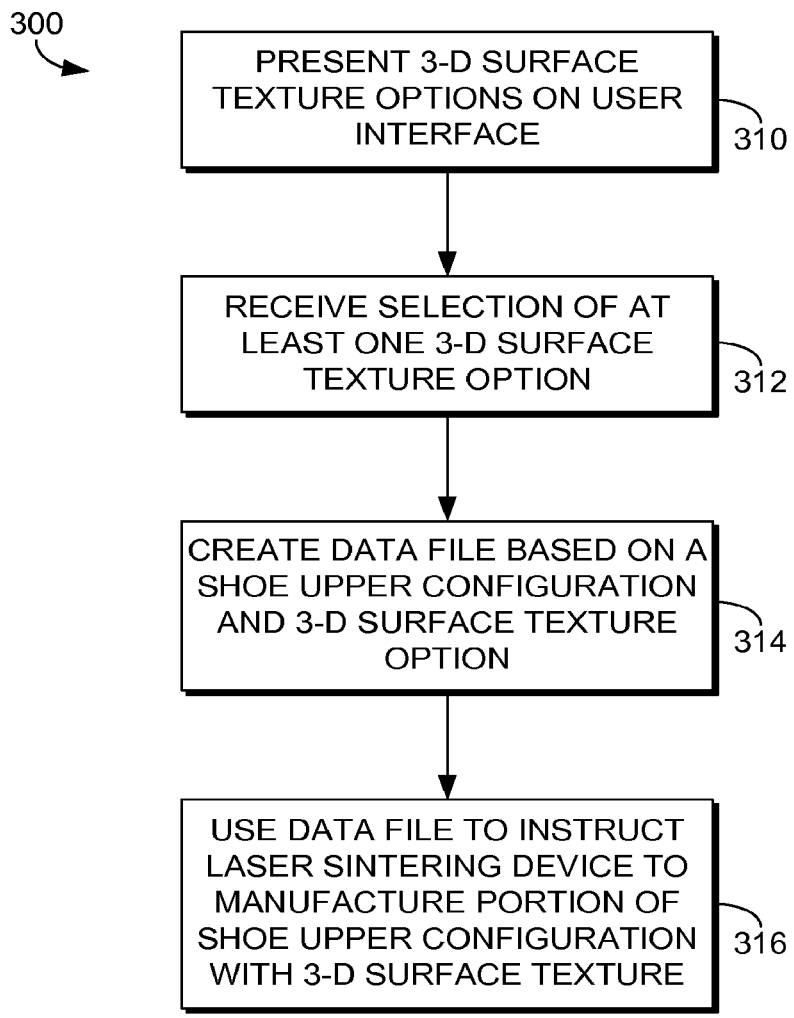
FIG. 3 depicts a flow diagram of an exemplary method of creating a three-dimensional surface texture on a shoe upper using a laser sintering device in accordance with aspects of the present invention.

Turning now to FIG. 3, a flow diagram is depicted illustrating an exemplary method 300 of manufacturing a shoe upper with a customized 3-D surface texture. At a step 310, a plurality of 3-D surface texture options are presented on a user interface. The 3-D surface texture options are associated with a plurality of 3-D surface textures to be applied to one or more portions of the shoe upper. In one aspect, the 3-D surface texture options may be presented subsequent to or concurrently with a plurality of shoe upper configuration options; the shoe upper configuration options are associated with a plurality of shoe upper configurations. In turn, shoe upper configurations may include such configurations as high-tops, mid-tops, low-tops, athletic (running-type uppers, water sport-type uppers, hiking-type uppers, etc.), casual, and the like.

In one aspect, the 3-D surface texture options may be dependent on the type of shoe upper configuration selected. For instance, if a water sport-type upper is selected, the 3-D surface texture options may comprise open-type (e.g., mesh-like, void-filled) textures that allow water to easily drain from the shoe. By contrast, if a hiking sport upper is selected, the 3-D surface texture options may include solid textures with areas of increased thickness to provide support and durability.

At a step 312, a selection of at least one 3-D surface texture option is received. As well, a selection of a shoe upper configuration option may also be received. In one aspect, upon receiving selections of the 3-D surface texture option and/or the shoe upper configuration option, a digital representation of the shoe upper configuration with the 3-D surface texture applied is presented on a user interface. Thus, a consumer at a point-of-sale could preview his or her shoe before deciding to purchase the shoe. In another example, a factory employee could preview the upper with the applied 3-D surface texture before beginning mass production of a shoe.

At a step 314, a data file is created based at least on the shoe upper configuration and the selected 3-D surface texture. The data file is modifiable. That is, additional data may be received concerning 3-D surface textures, the upper, or other parts of the shoe; the data file may be updated based on the additional data.

At a step 316, the data file is used to instruct a laser sintering device to manufacture the portion of the shoe upper configuration comprising the selected 3-D surface texture using techniques as described above. In one aspect, the data file is used to instruct the laser sintering device to manufacture the entire shoe upper configuration. The shoe upper configuration may be manufactured in two or more discrete portions that are subsequently joined together to create the shoe upper configuration. The different portions may be joined together by stitching, adhesively bonding, or fusing. Further, different 3-D surface textures may be applied to the different discrete portions.

Figure 10:
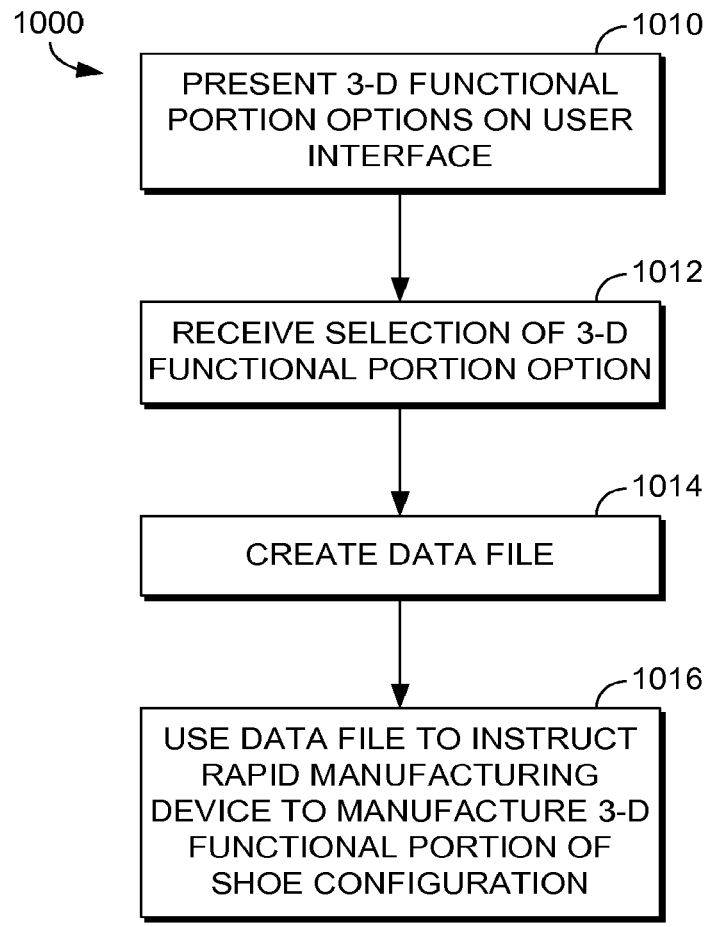
FIG. 10 depicts a flow diagram of an exemplary method of creating a 3-D portion of a shoe having a first type of functional property using rapid manufacturing techniques in accordance with aspects of the present invention.

Turning to FIG. 10, a flow diagram is depicted illustrating an exemplary method 1000 for creating a 3-D portion of a shoe having a first type of functional property using rapid manufacturing techniques. The 3-D functional portion may comprise a flexible forefoot portion in the forefoot area (e.g., region 124 of FIG. 1) of the shoe, a heel lockdown portion in the heel area (e.g., region 128 of FIG. 1) of the shoe, a midfoot support portion in the midfoot area (e.g., region 126 of FIG. 1) of the shoe, and/or a breathability portion applied to areas of the upper, midsole, and/or outsole of the shoe. Additional functional characteristics and locations are contemplated.

At a step 1010, a plurality of 3-D functional portion options are presented on a user interface, such as a display monitor coupled with a computing device. The 3-D functional portion options are associated with one or more 3-D functional portions that are configured to be applied to an area(s) of the shoe. The 3-D functional portion options may be presented in conjunction with the 3-D surface texture options discussed above. In one aspect, the 3-D surface texture options presented may be dependent on the 3-D functional portion options presented and vice versa. The functional portion options may include product or identification codes corresponding to the different 3-D functional portions, textual descriptions of the different 3-D functional portions, visual images of the different 3-D functional portions, auditory descriptions of the different functional portions, and the like.

As mentioned, the different 3-D functional portions may include a forefoot flexibility portion configured to provide a user a greater degree of flexibility in the forefoot region of the shoe as compared to a traditional shoe, a midfoot support portion configured to provide custom support in the midfoot region of the shoe based on, for example, a scan of the user's foot, and a heel lockdown portion configured to provide a greater degree of support or rigidity in the heel region of the shoe as compared to a traditional shoe. Further, a 3-D functional portion may include a breathability portion applied to selected areas of the shoe. The breathability portion is configured to promote air circulation and to allow water to freely exit the shoe.

In one aspect, the 3-D functional portion options are presented after (or prior to) a scan of a foot of a user is performed (if a custom foot scan is utilized). The scan may be performed using known methods, computer systems, and software. The scan is performed to obtain various physical characteristics of the foot of the wearer in order to design a customized shoe that fits the specifications and characteristics of the user's foot. From the scan, a 3-D shoe design data file is created that integrates features specific to a scanned foot (e.g., arch support, width, and/or length) and may be stored in association with a data store. While the foregoing exemplary method utilizes a custom scan of a user's foot, it is contemplated that one or more 3-D functional portions may be selected and integrated into/with a non-scan-generated shoe design data file, in another exemplary aspect discussed hereinafter.

At a step 1012, a selection of at least one 3-D functional portion option is received. Selections of 3-D surface texture option(s) may also be received at step 1012. The selected 3-D functional portion option is associated with a first 3-D functional portion to be applied to an area of the shoe. In one aspect, selections of additional 3-D functional portion options corresponding to other 3-D functional portions may be received. These additional 3-D functional portions may be applied to a same area of the shoe as the first 3-D functional portion or to a different area of the shoe as the first 3-D functional portion. Upon a system receiving a 3-D functional portion option, the system applies the associated functional portion to a design file of the affected shoe area. Therefore, it is contemplated, in an exemplary aspect, that any type of function portion may be combined at any location(s).

At a step 1014, a data file is created based at least on the shoe configuration data file created subsequent to scanning the user's foot and the received selection(s) of the 3-D functional portion(s). It is contemplated that the scanning of the foot is optional and may not be implemented in exemplary aspects. The 3-D shoe design data file may already be stored in association with a data store. Once the 3-D functional portion option is received, the 3-D shoe design data file is updated to reflect the 3-D functional portion to be applied to the area of the shoe. The 3-D shoe design data file may be augmented multiple times as different 3-D functional portion options are received. Further, the 3-D shoe design data file may be augmented or updated based on any received 3-D surface texture options. It is contemplated that the augmenting of the design data file includes applying appropriate information and/or calls to information such that when a rapid manufacturing process implements the design data file, the resulting object includes the selected functional portion(s) in the appropriate area of the shoe.

In one aspect, the 3-D shoe design data file is a generic file intended to mass produce shoes of a certain size using rapid manufacturing techniques. In other words, in some aspects, the 3-D shoe design data file may not be specific to the characteristics of an individual user. The generic 3-D shoe design data file may still be augmented or modified upon receiving selections of one or more 3-D functional portion options (e.g., a factory employee may select one or more functional portions to be applied to the shoe).

At a step 1016, the data file is used to instruct a rapid manufacturing device to manufacture at least the area(s) of the shoe comprised of one or more of the 3-D functional portions using a rapid manufacturing technique such as laser sintering, sterolithography, solid deposition modeling, and the like. As well, the data file may be used to instruct a rapid manufacturing device to manufacture areas of the shoe comprised of one or more 3-D surface textures. Further, the 3-D surface textures may be applied to the one or more 3-D functional portions. For instance, a user may select a heel lockdown functional portion to be applied to an upper portion of the shoe in the heel area. The user may further select a 3-D surface texture to be applied to the heel lockdown functional portion. Any and all such variations are contemplated as being within the scope of the invention.

In one aspect, the 3-D functional property is created using different types of powders or materials to impart the different types of functional properties. For example, rigid-type powders (or other materials) may be used to create the midfoot support portion or the heel lockdown portion of the shoe, while more flexible-type powders may be used to create the forefoot flexibility portion or the breathability portion of the shoe. In another aspect, the 3-D functional property is created by using different wall thickness or textures to impart the different types of functional properties. This will be explained in greater depth below.

Figure 4:
FIG. 4 depicts a side perspective view of a shoe having an exemplary 3-D surface texture formed according to aspects of the present invention.

FIGS. 4-8 depict some examples of 3-D surface textures created using the methods outlined in FIGS. 2 and 3. FIG. 4 depicts a side perspective view of a shoe 400. The shoe 400 comprises an upper 410 and a sole complex 416 (comprised of an outsole and a midsole). The shoe 400 also includes a 3-D surface texture 412. The 3-D surface texture 412 is a textual element that is applied to portions of the sole complex 416 and the upper 410 using rapid manufacturing techniques. A user may be able to customize the textual elements. For instance, the textual elements may be the user's name or a brand. As well, the textual elements may be a different color than other parts of the shoe 400. The upper 410 and the sole complex 416 may all be integrally formed together using rapid manufacturing techniques. Further, it is contemplated that the 3-D surface texture 412 is integrally formed with either the upper 410 or the sole complex 416 prior to joining the respective other portion.

Figure 5:
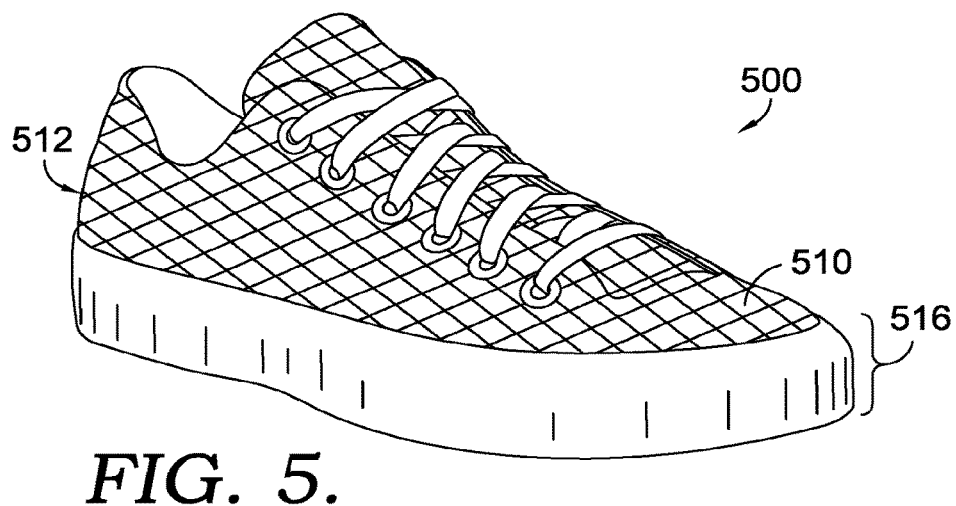
FIG. 5 depicts another side perspective view of a shoe having an exemplary 3-D surface texture formed according to aspects of the present invention.

FIG. 5 depicts a shoe 500 having a sole complex 516 and an upper 510. The upper 510 may be formed using rapid manufacturing techniques while the sole complex 516 may be formed using conventional techniques. The upper 510 is then attached to the sole complex 516 via bonding, fusing, lasting, strobel, etc. Conversely, both the upper 510 and the sole complex 516 may be integrally formed together using rapid manufacturing techniques. The upper 510 is manufactured with a 3-D surface texture 512. In this case, the 3-D surface texture 512 comprises a weave-like texture having interconnected ridges and valleys forming the weave-like pattern.

Figure 6:
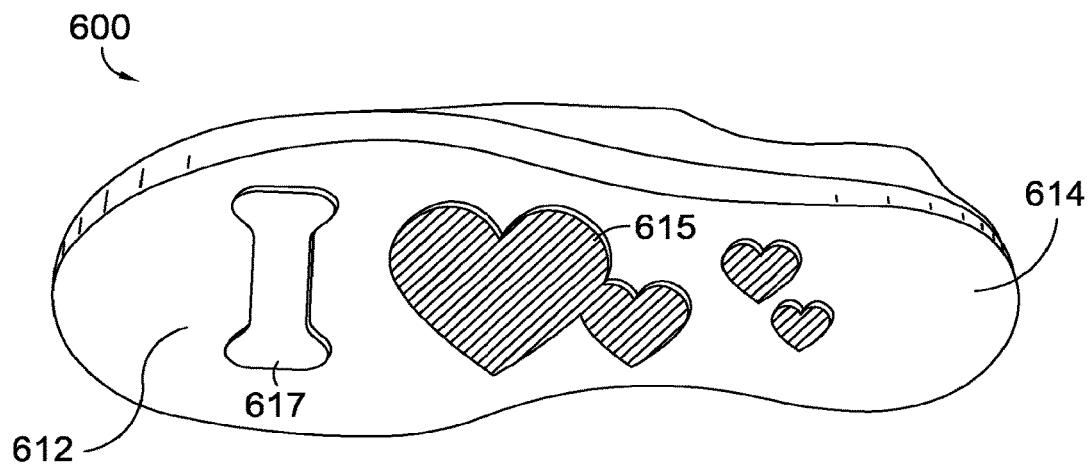
FIG. 6 depicts a bottom perspective view of a shoe having an exemplary 3-D surface texture formed according to aspects of the present invention.

FIG. 6 depicts a bottom view of a shoe 600. An outsole 614 is shown with a 3-D surface texture 612. The outsole 614 and the 3-D surface texture 612 may be formed using rapid manufacturing techniques. The 3-D surface texture 612 has areas of increased (e.g., offset) and decreased (e.g., inset/recessed) thickness that not only create aesthetic appeal, but also produce interesting footprints when a user is walking on sand or other conforming surfaces. Additionally, the 3-D surface texture applied to a ground-contacting surface of the sole allows for customized tread patterns and locations. The 3-D surface texture 612 may include areas having a first color 615 and areas having a second color 617.

Figure 7:
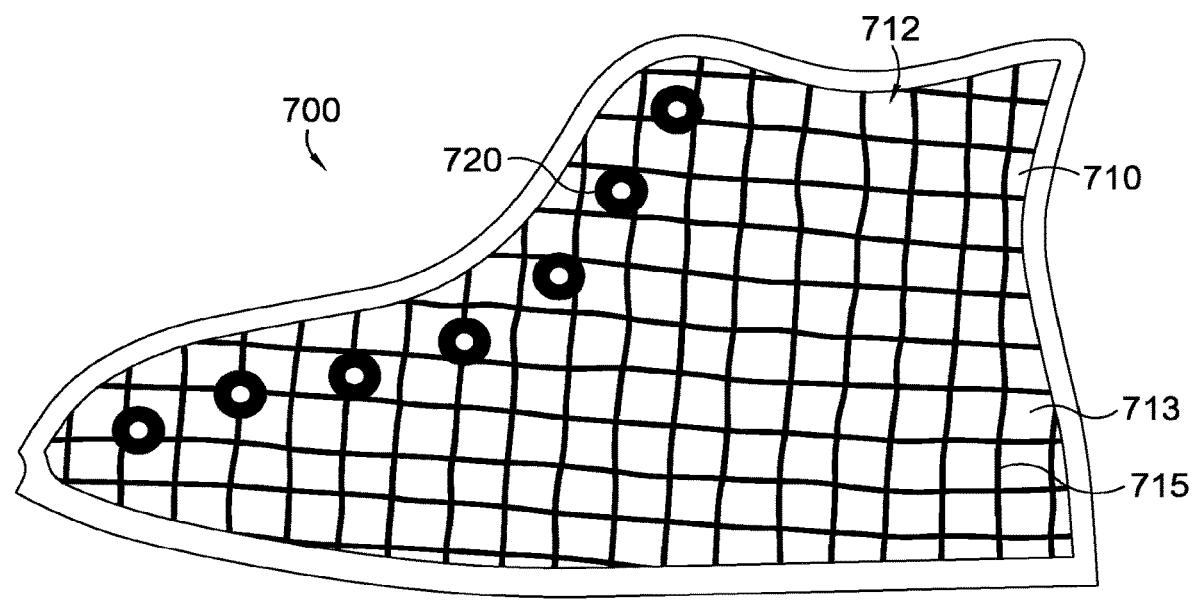
FIG. 7 depicts an exemplary discrete portion of an upper formed according to aspects of the present invention.

FIG. 7 depicts a discrete portion 700 of a shoe upper 710. The upper 710 is comprised of a uniform sintered material made using rapid manufacturing techniques. The upper 710 includes areas having a first thickness 713 extending between an interior surface (not shown) and an exterior surface (a surface onto which the 3-D surface texture is visible in FIG. 7). The upper 710 also includes areas having a second thickness 715 extending between the interior surface and the exterior surface. In combination, these areas produce a 3-D surface texture 712. The upper 710 also includes a plurality of eyelet holes 720 that are integrally formed from and within the uniform sintered material as they extend between the interior surface and the exterior surface.

The portion 700 may be joined with additional portions to form a complete shoe. For instance, the portion 700 may be joined with a mirror-image upper portion to form a complete (or near complete) upper. As well, the portion 700 may be joined with a sole complex to form a shoe. The portion 700 may be joined with other portions through stitching, adhesively bonding, fusing, and the like. The other portions to which the portion 700 is joined may comprise uniform sintered materials or conventional materials (leather, vinyl, rubbers, etc.).

Figure 8:
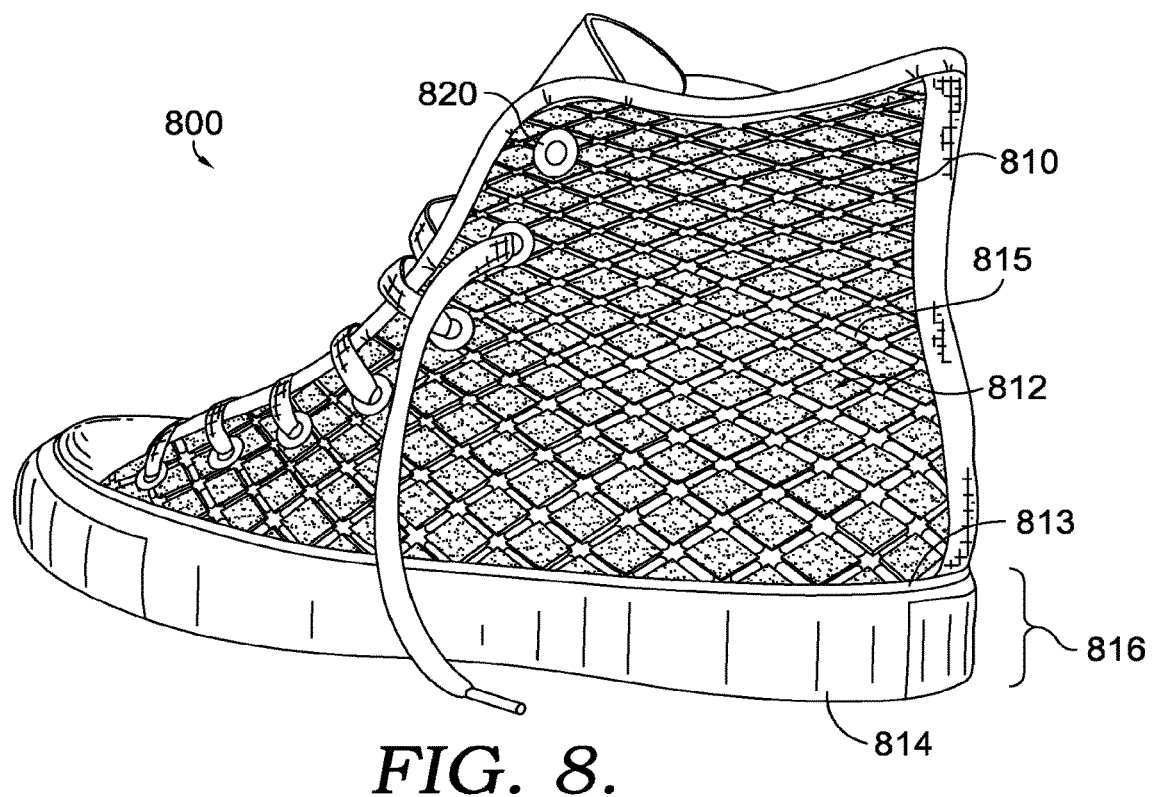
FIG. 8 depicts an exemplary shoe having an exemplary 3-D surface texture formed according to aspects of the present invention.

FIG. 8 depicts a shoe 800 comprised of an upper portion 810 having a 3-D surface texture 812 on an exterior surface and formed using rapid manufacturing techniques. The upper portion 810 includes a series of integrally formed eyelet holes 820. The shoe 800 also includes a sole complex 816 comprised of a midsole 813 and an outsole 814. The midsole 813 and/or the outsole 814 may be formed using rapid manufacturing techniques, or, alternatively, the midsole 813 and/or outsole 814 may be formed using conventional materials.

The upper portion 810 is joined to a second mirror-image upper portion (not shown) to help complete the upper. The second upper portion may have the same 3-D surface texture as the upper portion 810, or the 3-D surface texture may be different. As shown, additional materials such as rubber, leather, and fabric may be used to complete the upper. The upper portion 810 may overlay a fabric portion 815 so that the fabric portion 815 rests against the wearer's foot. In this example, the fabric portion 815 is visible through the exterior surface of the upper 810 by way of one or more apertures formed in the upper. Therefore, it is contemplated that an interior surface of an upper may contact an interior liner (e.g., sock liner) or other functional and aesthetic-enhancing materials.

Figure 11:
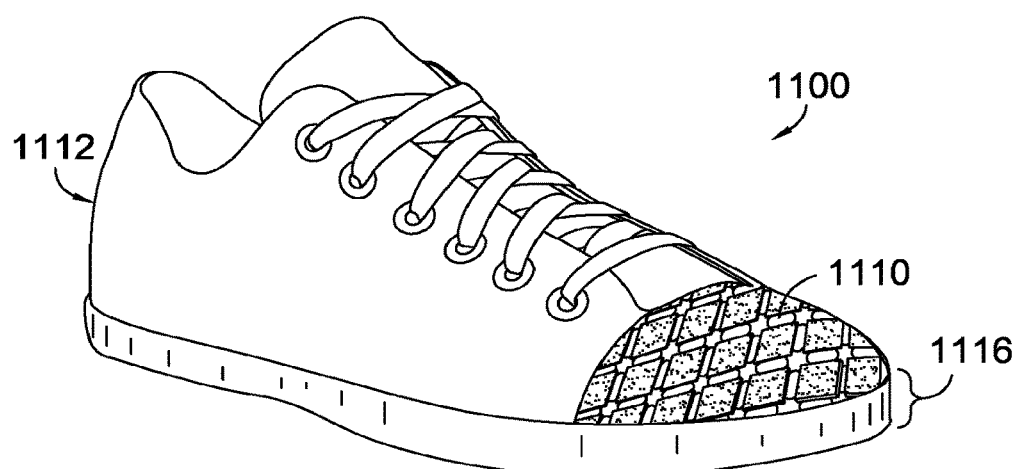
FIG. 11 depicts a side perspective view of a shoe having an exemplary 3-D functional forefoot flexibility portion formed according to aspects of the present invention.

FIGS. 11-14 depict some examples of 3-D functional portions created using the exemplary method 1000 outlined in FIG. 10, in accordance with aspects of the present invention. FIG. 11 depicts a side perspective view of a shoe 1100, in accordance with an aspect of the present invention. The shoe 1100 comprises an upper 1112, and a sole complex 1116. The shoe 1100 further comprises a forefoot flexibility portion 1110. The forefoot flexibility portion 1110 is applied to a forefoot area of the shoe 1100 and is configured to provide a greater degree of flexibility to this region as compared to shoes manufactured without the forefoot flexibility portion 1110. Increased forefoot flexibility may benefit wearers such as rock climbers, runners, hikers, and the like.

In one aspect, the forefoot flexibility portion 1110 is created by generating, using rapid manufacturing techniques, a shoe wall in a shoe upper portion in the forefoot area that has a thickness that is less than the thickness of a shoe wall in the forefoot area of a shoe manufactured without the forefoot flexibility portion. Exemplary thicknesses may include thicknesses between 0.5 mm and 5 mm. Flexibility may further be increased in the forefoot flexibility portion 1110 by creating a grid-like texture in the forefoot area as shown in FIG. 11. The grid-like texture comprises a framework of crisscrossing members and open areas. The grid-like texture may be configured such that the open areas have dimensions of approximately 5 mm×5 mm, 10 mm×10 mm, 15 mm×15 mm, 20 mm×20 mm, 5 mm×10 mm, 10 mm×15 mm, 5 mm×20 mm, or any combination/dimension in between. Larger open areas contribute to the flexibility of the forefoot flexibility portion 1110. Additionally, the forefoot flexibility portion 1110 may be created or augmented (using rapid manufacturing techniques) by reducing the thickness of the sole complex 1116 in the forefoot area as compared to the thickness of a sole complex in the forefoot area of a shoe manufactured without the forefoot flexibility portion. The thickness of the sole complex may be reduced by reducing the thickness of the midsole, the outsole, and/or both the midsole and the outsole.

Figure 12:
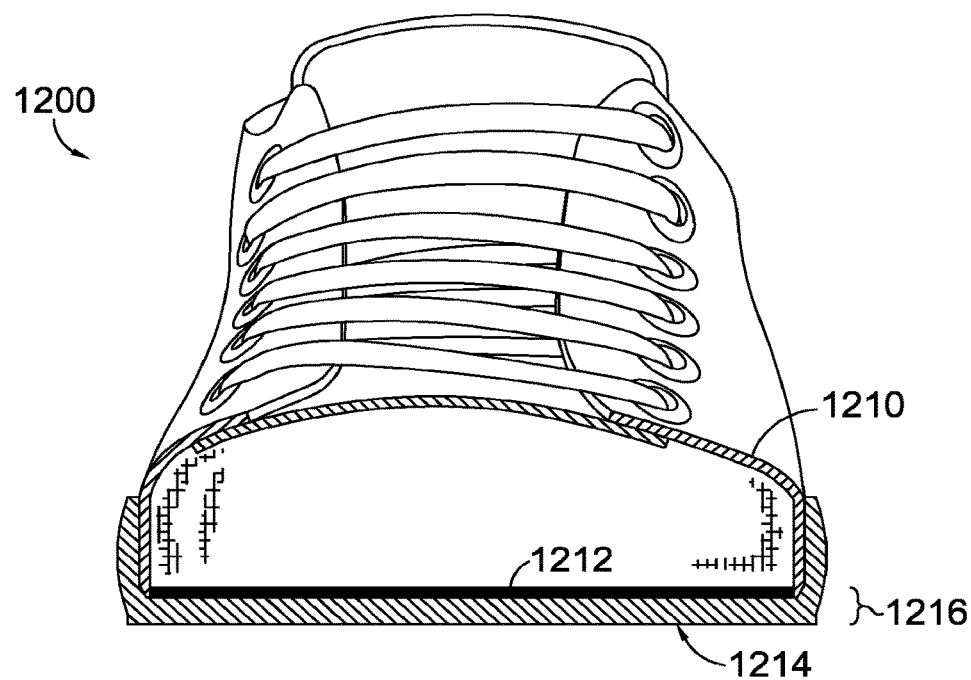
FIG. 12 depicts a cross-sectional view of a shoe taken along line 12-12 of FIG. 1 illustrating a midsole of the shoe in a forefoot area of the shoe formed according to aspects of the present invention.
Figure 13:
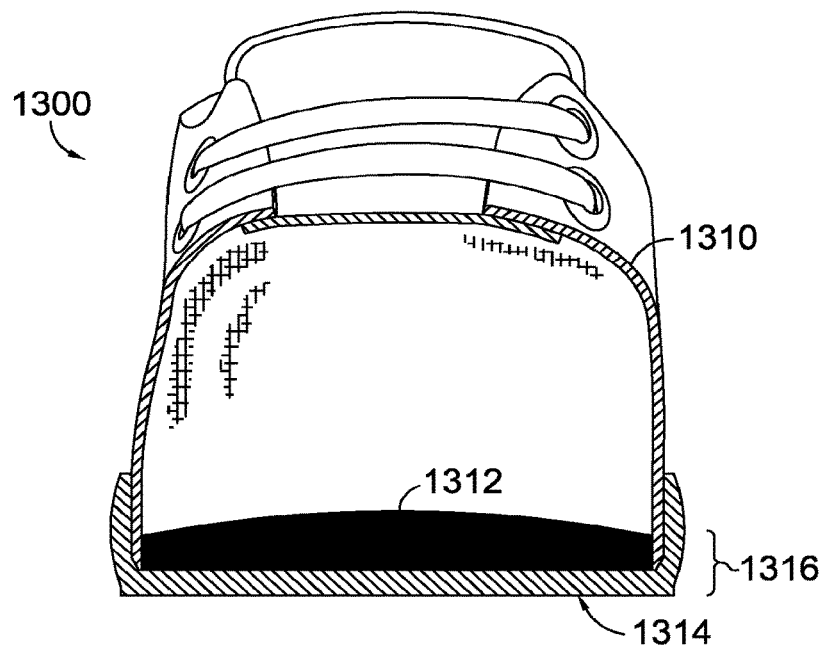
FIG. 13 depicts a cross-sectional view of a shoe taken along line 13-13 of FIG. 1 illustrating an exemplary 3-D functional portion in a midfoot area of the shoe formed according to aspects of the present invention.

FIGS. 12-13 depict cross-sectional views of the shoe 100 of FIG. 1 and illustrate forefoot and a midfoot support functional portions respectively, in accordance with aspects of the present invention. FIG. 12 is a cross-sectional view taken along line 12-12 of FIG. 1, while FIG. 13 depicts a cross-sectional view taken along line 13-13 of FIG. 1. FIG. 12 includes an upper 1210, a midsole 1212, an outsole 1214, and a sole complex 1216 comprised of the midsole 1212 and the outsole 1214. Since FIG. 12 is a cross-sectional view taken from the forefoot region of the shoe 100, the midsole 1212 is fairly thin to improve flexibility in the forefoot region, in this exemplary aspect.

The cross-sectional view of FIG. 13 is taken from the midfoot region of the shoe 100. FIG. 13 includes an upper 1310, a midfoot support portion 1312, an outsole 1314, and a sole complex 1316 comprised of the midfoot support portion 1312 and the outsole 1314. The thickness of the midfoot support portion 1312 is greater than the thickness of the midsole 1212. Further, the midfoot support portion 1312 has a thickness greater than a midsole thickness of a shoe manufactured without the midfoot support portion 1312. Increased thickness in this area provides support to the midfoot area of the foot. It is contemplated that the midfoot support portion 1312 may have portions of varying thickness along the shoe's width to create a customized midsole based on a scan of the user's foot.

The midfoot support portion 1312 is manufactured, using rapid manufacturing techniques, by generating a first thickness of a shoe sole portion in the midfoot area of the shoe that is greater than a second thickness associated with the shoe configuration without the midfoot support portion.

Figure 14:
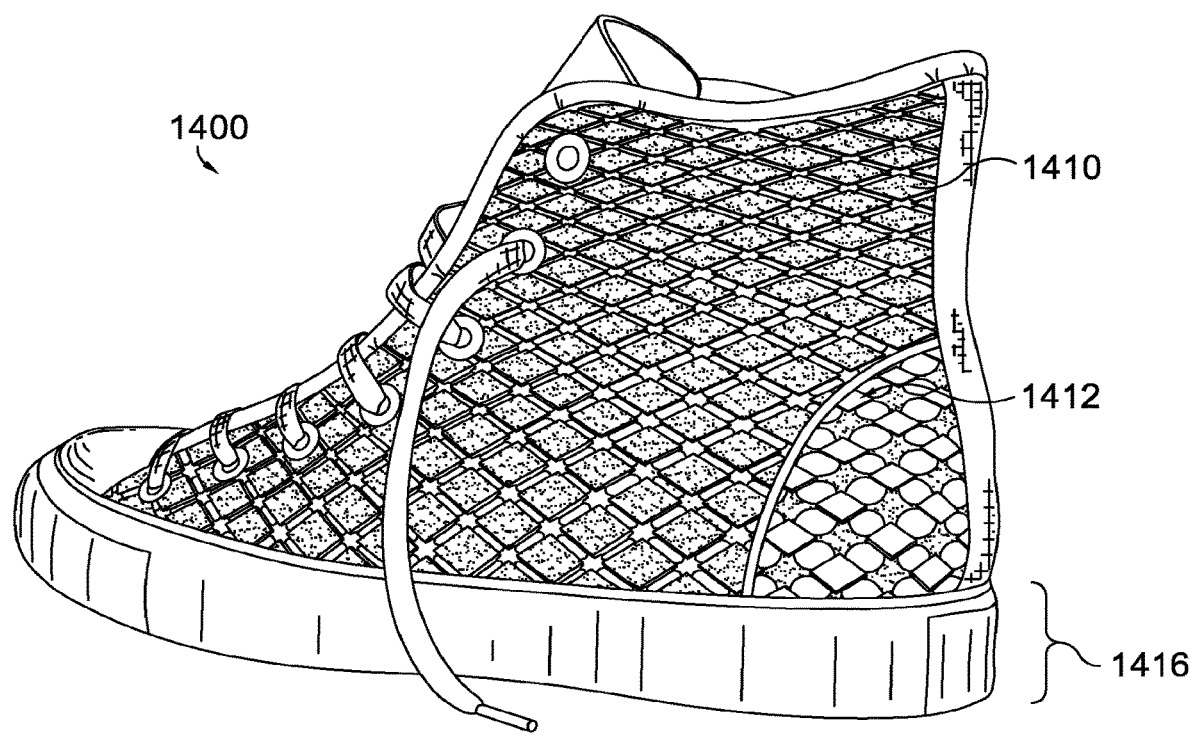
FIG. 14 depicts an exemplary view of a shoe having an exemplary 3-D functional heel lockdown portion and an exemplary 3-D functional breathability portion formed according to aspects of the present invention.

FIG. 14 depicts a shoe 1400 comprising a breathability function portion 1410, and a sole complex 1416. The shoe 1400 further comprises a heel lockdown functional portion 1412 in the heel area of the upper of the shoe 1400. The heel lockdown portion 1412 is configured to provide extra support and/or rigidity to the heel area of the user's foot. The heel lockdown portion 1412 may be generated, using rapid manufacturing techniques, by creating a grid-like texture in an upper portion of the shoe in the heel area. The grid-like texture comprises a framework of crisscrossing members and open areas. The crisscrossing members of the grid-like texture may have a predetermined thickness that is greater than a thickness associated with a shoe without the heel lockdown functional portion 1412. Exemplary thicknesses may include thicknesses between 4 and 10 mm. The heel lockdown portion 1412 may also be generated, using rapid manufacturing techniques, by creating a solid wall in an upper portion of the shoe 1400 in the heel area having a predetermined thickness that is greater than a thickness associated with a shoe without the heel lockdown functional portion 1412. Exemplary thicknesses include thicknesses between 4 and 10 mm.

The breathability functional portion 1410 is applied to, for example, the shoe upper in the forefoot and midfoot region of the shoe 1400. The breathability functional portion 1410 may be manufactured, using rapid manufacturing techniques, by creating a grid-like texture in an upper portion of the shoe 1400. The grid-like texture is comprised of crisscrossing members and open areas. The crisscrossing members may comprise solid bars, tubular structures, and the like. The breathability functional portion 1410 is configured to increase air exchange between the outside environment and the interior of the shoe 1400 and also to let any water within the shoe 1400 to easily escape.

Although FIG. 14 depicts the breathability functional portion 1410 applied to substantially all of the upper portion in the forefoot and midfoot area of the shoe 1400, it is contemplated that the breathability functional portion 1410 may be applied to more discrete areas in the upper portion of the forefoot area, the midfoot area, and/or the heel area of the shoe 1400. The breathability functional portion 1410 may overlay a fabric portion so that the fabric portion rests against the wearer's foot. The fabric portion, in turn, may be comprised of material that further increases the breathability aspects of the breathability functional portion 1410. In another aspect, a fabric underlay is not utilized, and the breathability functional portion 1410 rests against the wearer's foot.

Figure 9:
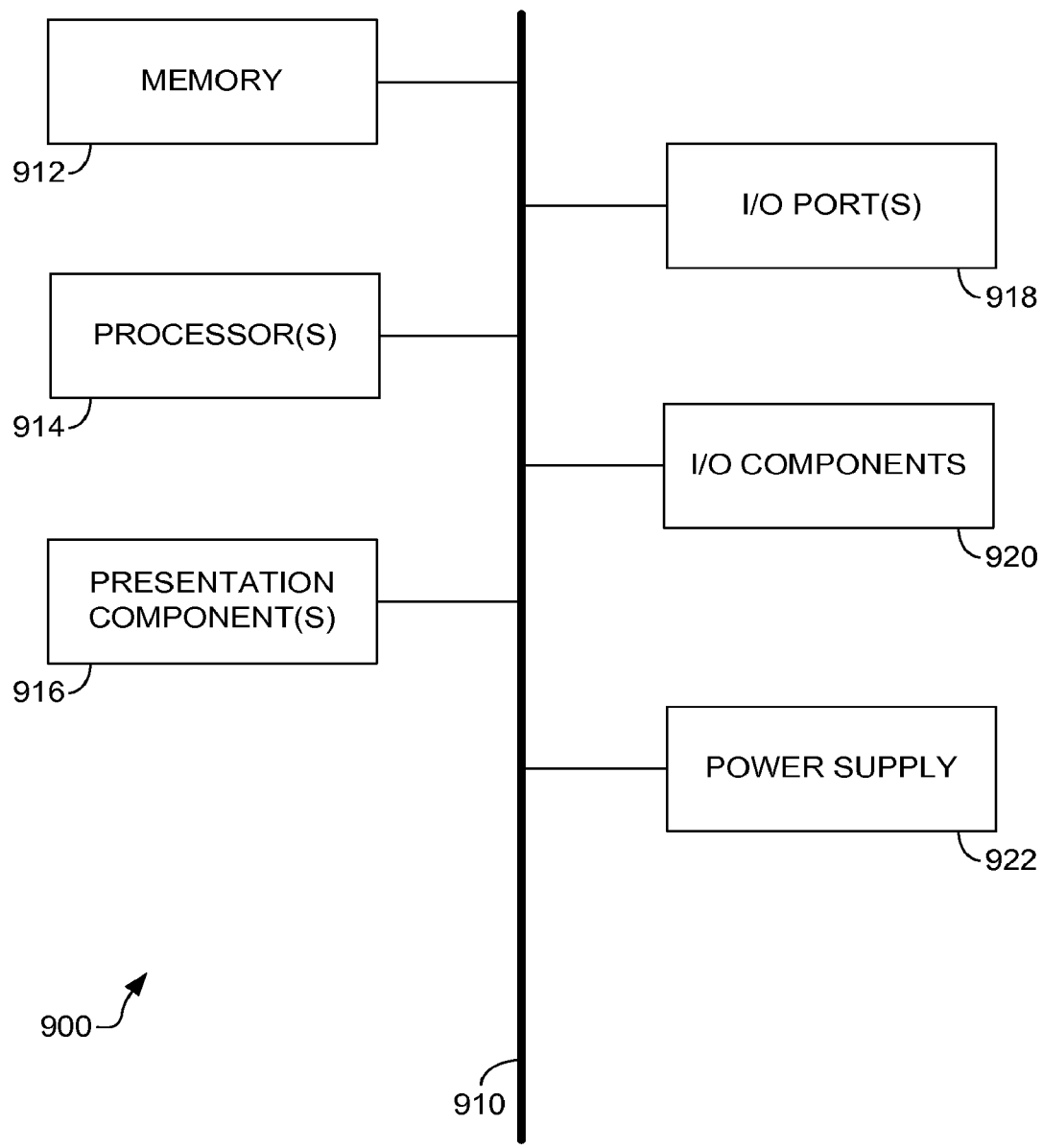
FIG. 9 is a block diagram of an exemplary computing environment suitable for use in implementing aspects of the present invention.

An exemplary computing environment suitable for use in implementing aspects of the present invention is described below in order to provide a general context for various aspects of the present invention. Referring to FIG. 9, such an exemplary computing environment is shown and designated generally as computing device 900. The computing device 900 is but one example of a suitable computing environment and is not intended to suggest any limitation as to the scope of use or functionality of embodiments of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 9, the computing device 900 includes a bus 910 that directly or indirectly couples the following devices: a memory 912, one or more processors 914, one or more presentation components 916, one or more input/output (I/O) ports 918, I/O components 920, and an illustrative power supply 922. The bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computer" or "computing device."

The computing device 900 typically includes a variety of computer-readable media. Computer-readable media may be any available media that is accessible by the computing device 900 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Communication media, on the other hand, embodies computer-readable instructions, data structures, program modules or other data in transport mechanism and includes any information delivery media.

The memory 912 includes computer-storage media in the form of volatile and/or nonvolatile memory. The memory may be removable, non-removable, or a combination thereof. Exemplary hardware devices include solid-state memory, hard drives, optical-disc drives, and the like. The computing device 900 includes one or more processors that read data from various entities such as the memory 912 or the I/O components 920. The presentation component(s) 916 present data indications to a user or other device. Exemplary presentation components include a display device, speaker, printing component, vibrating component, and the like.

The I/O ports 918 allow the computing device 900 to be logically coupled to other devices including the I/O components 920, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a set of one or more processes distributed on one or more computers, one or more stand-alone storage devices, a set of one or more other computing or storage devices, a combination of one or more of the above, and the like.

The present invention has been described in relation to particular examples, which are intended in all respects to be illustrative rather than restrictive. Alternative embodiments will become apparent to those of ordinary skill in the art to which the present invention pertains without departing from its scope. Certain features and subcombinations are of utility and may be employed without reference to other features and subcombinations and are contemplated within the scope of the claims.

What is claimed is:

1. A computerized method for creating a shoe configuration using solid deposition modeling, the computerized method carried out by a processor running on a computer and comprising:

presenting a plurality of shoe upper configuration options on a user interface, the plurality of shoe upper configuration options associated with a plurality of shoe upper configurations;

receiving a selection of a first shoe upper configuration option of the plurality of shoe upper configuration options, the first shoe upper configuration option associated with a first shoe upper configuration;

presenting a plurality of three-dimensional (3-D) functional portion options on the user interface, each of the plurality of 3-D functional portion options associated with one of a plurality of 3-D functional portions to be applied to an area of the first shoe upper configuration;

receiving a selection of at least one 3-D functional portion option of the plurality of 3-D functional portion options, the at least one 3-D functional portion option associated with a first 3-D functional portion, wherein the first 3-D functional portion comprises one or more of a forefoot flexibility functional portion, a breathability functional portion, and a heel lockdown functional portion;

subsequent to receiving the selection of the first shoe upper configuration option, presenting a plurality of 3 D surface texture options on the user interface, each of the plurality of 3-D surface texture options associated with one of a plurality of 3-D surface textures, wherein the plurality of 3-D surface texture options presented is customized based upon the selection of the first shoe upper configuration option;

receiving a selection of a first 3-D surface texture option of the plurality of 3-D surface texture options, the first 3-D surface texture option associated with a first 3-D surface texture;

generating an augmented design data file based at least on a 3-D shoe design data file, the received selection of the first shoe upper configuration, the received selection of the first 3-D functional portion, and the received selection of the first 3-D surface texture; and using the augmented design data file to instruct a rapid manufacturing device to manufacture the first shoe upper configuration having the first 3-D functional portion and the first 3-D surface texture using solid deposition modeling.

2. The computerized method of claim 1, further comprising:
performing a scan of a foot of a user; and
creating the 3-D shoe design data file based, at least in part, on the performed scan.

3. The computerized method of claim 1, further comprising combining the first shoe upper configuration having the first 3-D functional portion and the first 3-D surface texture with one or more additional shoe portions to form a shoe.

4. The computerized method of claim 3, wherein the one or more additional shoe portions comprise at least one or more of a midsole and an outsole.

5. The computerized method of claim 3, wherein the one or more additional shoe portions comprise at least one or more additional portions of the first shoe upper configuration.

6. The computerized method of claim 1, wherein at least one of the plurality of 3-D surface texture options is associated with a 3-D surface texture customized by a user.

7. The computerized method of claim 1, wherein subsequent to receiving the selection of the first 3-D surface texture option of the plurality of 3-D surface texture options, presenting a digital representation of the first shoe upper configuration with the first 3-D surface texture applied thereto on the user interface.

8. A computerized method for creating a shoe configuration using solid deposition modeling, the computerized method carried out by a processor running on a computer and comprising:

presenting a plurality of shoe upper configuration options on a user interface, the plurality of shoe upper configuration options associated with a plurality of shoe upper configurations;

receiving a selection of a first shoe upper configuration option of the plurality of shoe upper configuration options, the first shoe upper configuration option associated with a first shoe upper configuration;

presenting a plurality of three-dimensional (3-D) functional portion options on the user interface, each of the plurality of 3-D functional portion options associated with one of a plurality of 3-D functional portions to be applied to an area of the first shoe upper configuration;

receiving a selection of at least one 3-D functional portion option of the plurality of 3-D functional portion options, the at least one 3-D functional portion option associated with a first 3-D functional portion, wherein the first 3-D functional portion comprises one or more of a forefoot flexibility functional portion, a breathability functional portion, and a heel lockdown functional portion;

subsequent to receiving the selection of the first shoe upper configuration option, presenting a plurality of 3 D surface texture options on the user interface, each of the plurality of 3-D surface texture options associated with one of a plurality of 3-D surface textures, wherein the plurality of 3-D surface texture options presented is customized based upon the selection of the first shoe upper configuration option;

receiving a selection of a first 3-D surface texture option of the plurality of 3-D surface texture options to be applied to a first portion of the upper of the first shoe upper configuration, the first 3-D surface texture option associated with a first 3-D surface texture;

receiving a selection of a second 3-D surface texture option of the plurality of 3-D surface texture options to be applied to a second portion of the first shoe upper configuration, the second 3-D surface texture option associated with a second 3-D surface texture;

generating an augmented design data file based at least on a 3-D shoe design data file, the received selection of the first shoe upper configuration, the received selection of the first 3-D functional portion, the first 3-D surface texture, and the second 3-D surface texture; and using the augmented design data file to instruct a rapid manufacturing device to manufacture the first shoe upper configuration comprised of the first 3-D functional portion, the first portion of the first shoe upper configuration and the first 3-D surface texture and the second portion of the first shoe upper configuration and the second 3-D surface texture using solid deposition modeling.

9. The computerized method of claim 8, wherein the first portion of the first shoe upper configuration is at a same location as the second portion of the first shoe upper configuration.

10. The computerized method of claim 9, wherein the first 3-D surface texture is manufactured before the second 3-D surface texture.

11. The computerized method of claim 8, wherein the first portion of the first shoe upper configuration is at a different location from the second portion of the first shoe upper configuration.

12. The computerized method of claim 8, wherein the first 3-D surface texture is a different texture from the second 3-D surface texture.

13. The computerized method of claim 8, wherein the 3-D shoe design data file corresponds to a scan of a user's foot.

14. A computerized method for creating a shoe configuration using solid deposition modeling, the computerized method carried out by a processor running on a computer and comprising:
- presenting a first plurality of visual images on a user interface, each of the first plurality of visual images associated with one of a plurality of shoe upper configurations;
- receiving a selection of a first visual image of the first plurality of visual images, the first visual image associated with a first shoe upper confirmation;
- presenting a plurality of three-dimensional (3-D) functional portion options on the user interface, each of the plurality of 3-D functional portion options associated with one of a plurality of 3-D functional portions to be applied to an area of the first shoe upper configuration;
- receiving a selection of at least one 3-D functional portion option of the plurality of 3-D functional portion options, the at least one 3-D functional portion option associated with a first 3-D functional portion, wherein the first 3-D functional portion comprises one or more of a forefoot flexibility functional portion, a breathability functional portion, and a heel lockdown functional portion;
- subsequent to receiving the selection of the first visual image associated with the first shoe upper configuration, presenting a second plurality of visual images on the user interface, each of the second plurality of visual images associated with one of a plurality of 3-D surface textures, wherein the second plurality of visual images presented is customized based upon the selection of the first visual image associated with the first shoe upper configuration;
- receiving a selection of a first visual image of the second plurality of visual images, the first visual image of the second plurality of visual images associated with a first 3-D surface texture;
- generating an augmented design data file based at least on a 3-D shoe design data file, the received selection of the first shoe upper configuration, the received selection of the first 3-D functional portion, and the received selection of the first 3-D surface texture; and
- using the augmented design data file to instruct a rapid manufacturing device to manufacture the first shoe upper configuration having the first 3-D functional portion and the first 3-D surface texture using solid deposition modeling.

15. The computerized method of claim 14, further comprising combining the first shoe upper configuration having the first 3-D functional portion and the first 3-D surface texture with one or more additional shoe portions to form a shoe.

16. The computerized method of claim 15, wherein the one or more additional shoe portions comprise at least one or more of a midsole and an outsole.

17. The computerized method of claim 15, wherein the one or more additional shoe portions comprise at least one or more additional portions of the first shoe upper configuration.

18. The computerized method of claim 14, wherein subsequent to receiving the selection of the first visual image of the second plurality of visual images, presenting a digital representation of the first shoe upper configuration with the first 3-D surface texture applied thereto on the user interface.

19. The computerized method of claim 14, wherein at least one of the second plurality of visual images is associated with a 3-D surface texture customized by a user.

* * * * *

UNITED STATES PATENT AND TRADEMARK OFFICE
CERTIFICATE OF CORRECTION

PATENT NO. : 10,575,584 B2
APPLICATION NO. : 15/887008
DATED : March 3, 2020
INVENTOR(S) : Sean M. McDowell, Bryan Paul Cioffi and Stephen N Bruno Page 1 of 1

It is certified that error appears in the above-identified patent and that said Letters Patent is hereby corrected as shown below:

In the Claims

Column 15, Line 18-19 Claim 1: Delete "3D" and insert -- 3-D --.
Column 16, Line 24-25 Claim 8: Delete "3D" and insert -- 3-D --.
Column 16, Line 50 Claim 8: Delete "texture" and insert -- texture, --.

Signed and Sealed this
Nineteenth Day of May, 2020

Andrei Iancu
*Director of the United States Patent and Trademark Office*